(12) United States Patent
Miyazaki et al.

(10) Patent No.: US 8,459,230 B2
(45) Date of Patent: Jun. 11, 2013

(54) IGNITION TIMING CONTROL APPARATUS FOR INTERNAL COMBUSTION ENGINE

(75) Inventors: Kazuma Miyazaki, Nagoya (JP); Hisao Iyoda, Okazaki (JP); Junichi Ichihara, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 884 days.

(21) Appl. No.: 12/599,422

(22) PCT Filed: May 27, 2008

(86) PCT No.: PCT/JP2008/060113
§ 371 (c)(1),
(2), (4) Date: Nov. 9, 2009

(87) PCT Pub. No.: WO2008/149831
PCT Pub. Date: Dec. 11, 2008

(65) Prior Publication Data
US 2010/0229829 A1 Sep. 16, 2010

(30) Foreign Application Priority Data
Jun. 1, 2007 (JP) .................................. 2007-147173

(51) Int. Cl.
*F02P 5/00* (2006.01)
*G06F 19/00* (2011.01)
*G06G 7/70* (2006.01)

(52) U.S. Cl.
USPC .................... 123/406.23; 123/406.59; 701/102

(58) Field of Classification Search
USPC ............. 123/406.11, 406.12, 406.19, 406.23, 123/406.24, 406.25, 406.58, 406.59, 339.11; 701/102
See application file for complete search history.

(56) References Cited

U.S. PATENT DOCUMENTS

| | | | |
|---|---|---|---|
| 4,506,639 A | 3/1985 | Murakami et al. | |
| 4,872,436 A | 10/1989 | Schultes | |
| 5,012,779 A | 5/1991 | Fukui et al. | |
| 5,697,337 A * | 12/1997 | Takahashi et al. | 123/339.11 |
| 6,223,722 B1 * | 5/2001 | Shimizu et al. | 123/406.18 |
| 6,276,131 B1 | 8/2001 | Ueno et al. | |
| 6,530,360 B1 * | 3/2003 | Kondo | 123/406.27 |
| 2004/0206333 A1 * | 10/2004 | Makino et al. | 123/406.59 |

FOREIGN PATENT DOCUMENTS

| | | |
|---|---|---|
| DE | 33 02 931 C2 | 3/1994 |
| DE | 40 12 271 C2 | 11/1996 |

(Continued)

OTHER PUBLICATIONS

Office Action Mar. 7, 2012 in DE 11 2008 001 304.7-13 and English translation thereof.

*Primary Examiner* — Stephen K Cronin
*Assistant Examiner* — Sizo Vilakazi
(74) *Attorney, Agent, or Firm* — Kenyon & Kenyon LLP

(57) ABSTRACT

An ignition timing control apparatus for an internal combustion engine, when determining that recalculations are possible from the time when final ignition timing is calculated normally to final ignition timing, recalculates the correction amount of the ignition timing by feedback control and the final ignition timing. Accordingly, engine speed at a time closer to actual ignition timing is reflected on the final ignition timing. This configuration prevents overshoot from occurring even when a feedback gain is made greater and thus allows highly-responsive feedback control of the ignition timing thereby suppressing the change in rotation of the engine effectively. When the recalculations are not performed, the final ignition timing based on the correction amount, as normally calculated, is used. Thus, the final ignition timing is maintained at certain accuracy and abnormal ignition such as accidental fire is prevented.

10 Claims, 8 Drawing Sheets

FOREIGN PATENT DOCUMENTS

| | | |
|---|---|---|
| DE | 699 24 957 T2 | 11/2005 |
| EP | 0 893 591 A2 | 1/1999 |
| EP | 1 862 670 A1 | 12/2007 |
| JP | 62-150075 A | 7/1987 |
| JP | 07-018395 | 1/1995 |
| JP | 2001-153013 A | 6/2001 |

* cited by examiner

IGNITION TIMING CONTROL APPARATUS FOR INTERNAL COMBUSTION ENGINE This is a 371 national phase application of PCT/JP2008/060113 filed 27 May 2008, claiming priority to Japanese Patent Application No. 2007-147173 filed 1 Jun. 2007, the contents of which are incorporated herein by reference.

FIELD OF THE INVENTION

The present invention relates to an ignition timing control apparatus for an internal combustion engine that sets ignition timing depending on an operating state of the engine and performs feedback control of the ignition timing with respect to rotational speed of the engine.

BACKGROUND OF THE INVENTION

For ignition timing control of the internal combustion engine, a technique has been proposed in which ignition timing is determined based on an operating state of the engine and the change in the rotation of the engine is detected as a change in angular signals until immediately before the actual ignition to set suitable ignition timing, as described in Japanese Examined Patent Publication 7-18395.

To further suppress the change in number of rotations or rotational speed of the engine in such ignition timing control, feedback control of the ignition timing may be performed with respect to the rotational speed of the engine. In this feedback control, base ignition timing, as calculated based on the operating state of the engine as described in Japanese Examined Patent Publication 7-18395, is corrected with a correction amount determined in the feedback control of the ignition timing.

However, such calculation for the feedback control takes a longer time compared to the control of Japanese Examined Patent Publication 7-18395 performed by correcting the ignition timing based on the detection of the change in angular signals. For this reason, the base ignition timing must be calculated at timing sufficiently before the piston comes to an ignition top dead center. Then, the calculation for the feedback control is performed based on the rotational speed of the engine to calculate the correction amount and the base ignition timing is corrected with the correction amount to obtain final ignition timing. Actual ignition is carried out after the final ignition timing elapses.

As described above, the final ignition timing is calculated at the timing sufficiently before the piston comes to the ignition top dead center. Unfortunately, this increases the potential for overshoot when the feedback gain is increased to achieve highly-responsive feedback control. This is because, when the period between the time when the final ignition timing was calculated and the actual final ignition timing becomes longer, the change in rotational speed of the engine during the period becomes considerable. The long waste time in the feedback control prevents effective suppression of the change in rotational speed of the engine.

SUMMARY OF THE INVENTION

An objective of the present invention is to provide an ignition timing control apparatus for an internal combustion engine that performs highly-responsive ignition timing feedback control so as to suppress the change in rotational speed of the engine effectively.

According to a first aspect of the invention, an ignition timing control apparatus for an internal combustion engine is provided. The ignition timing control apparatus sets ignition timing depending on an operating state of the engine and performs feedback control of the ignition timing with respect to rotational speed of the engine. The ignition timing control apparatus comprises a base ignition timing calculation section, a correction amount calculation section, a final ignition timing calculation section, a final ignition timing recalculation section and an ignition timing setting section. The base ignition timing calculation section calculates base ignition timing based on the operating state of the engine at a time to calculate the base ignition timing set prior to an ignition top dead center. The correction amount calculation section calculates a correction amount of the ignition timing by feedback control at a time to calculate the feedback control of the ignition timing set prior to the ignition top dead center. The final ignition timing calculation section calculates final ignition timing by correcting the base ignition timing calculated in the base ignition timing calculation section with the correction amount calculated in the correction amount calculation section. The final ignition timing recalculation section, during the period between the time when the final ignition timing was calculated in the final ignition timing calculation section and the final ignition timing, recalculates the correction amount and the final ignition timing by correcting the base ignition timing with the recalculated correction amount. The ignition timing setting section sets ignition timing used for an actual ignition based on the final ignition timing calculated in the final ignition timing calculation section and the result of the recalculation obtained in the final ignition timing recalculation section.

Based on this configuration, if there are results of the recalculation obtained in the recalculation processing, the final ignition timing should reflect the engine speed NE at the timing closer to the actual ignition timing. Therefore, even if the feedback gain is increased, overshoot is unlikely to occur. This enables highly responsive ignition timing feedback control thereby suppressing the change in rotation of the engine effectively. On the other hand, even if the recalculation processing is impossible and the results of the recalculation at do not exist, the final ignition timing has already been set where the final ignition timing is calculated as actual ignition timing by using the correction amount θfb calculated at the normal timing. Therefore, the final ignition timing is maintained at certain accuracy and abnormal ignition such as accidental fire is prevented.

According to a second aspect of the invention, an ignition timing control apparatus for an internal combustion engine is provided. The ignition timing control apparatus sets ignition timing depending on an operating state of the engine and performs feedback control of the ignition timing with respect to rotational speed of the engine. The ignition timing control apparatus comprises a base ignition timing calculation section, a correction amount calculation section, a final ignition timing calculation section, an initial ignition timing setting section, a recalculation possibility determination section, a final ignition timing recalculation section and ignition timing resetting section. The base ignition timing calculation section calculates base ignition timing based on the operating state of the engine at a time to calculate the base ignition timing set prior to an ignition top dead center. The correction amount calculation section calculates a correction amount of the ignition timing by feedback control at a time to calculate the feedback control of the ignition timing set prior to the ignition top dead center. The final ignition timing calculation section calculates final ignition timing by correcting the base ignition timing calculated in the base ignition timing calculation section with the correction amount calculated in the correction amount calculation section. The initial ignition timing setting section sets the final ignition timing calculated in the final ignition timing calculation section to ignition timing used for an actual ignition. The recalculation possibility determination section, during the period between the time when the final ignition timing was calculated in the final ignition timing calculation section and the final ignition timing, determines if the recalculation of the correction amount and the recalculation of the final ignition timing by correcting the base ignition timing with the recalculated correction amount are possible. The final ignition timing recalculation section, when it is determined that the recalculations in the recalculation possibility determination section are possible, recalculates the correction amount and the final ignition timing by correcting the base ignition timing with the recalculated correction amount. The ignition timing resetting section, when the final ignition timing is recalculated in the final ignition timing recalculation section, cancels the setting of the ignition timing in the initial ignition timing setting section and sets the final ignition timing recalculated in the final ignition timing recalculation section to the ignition timing used for the actual ignition.

Based on this configuration, the effect of the first aspect is obtained. In addition, the ignition timing has already been set. the ignition timing has not been set in advance and this ignition timing is not cancelled when the recalculation fails to complete in time. When the crank angle of the engine reaches a position corresponding to this ignition timing, ignition is carried out at certain accuracy. Thus, abnormal ignition such as accidental fire is prevented. Further, whether the recalculation processing is performed or not is determined based on the final ignition timing calculated at the normal timing. This determination can be performed easily. If the recalculation processing is possible, the recalculation may be performed at suitable timing.

According to a third aspect of the invention, an ignition timing control apparatus for an internal combustion engine is provided. The ignition timing control apparatus sets ignition timing depending on an operating state of the engine and performs feedback control of the ignition timing with respect to rotational speed of the engine. The ignition timing control apparatus comprises a base ignition timing calculation section, a correction amount calculation section, a final ignition timing calculation section, a recalculation possibility determination section, a final ignition timing recalculation section and an ignition timing setting section. The base ignition timing calculation section calculates base ignition timing based on the operating state of the engine at a time to calculate the base ignition timing set prior to an ignition top dead center. The correction amount calculation section calculates a correction amount of the ignition timing by feedback control at a time to calculate the feedback control of the ignition timing set prior to the ignition top dead center. The final ignition timing calculation section calculates final ignition timing by correcting the base ignition timing calculated in the base ignition timing calculation section with the correction amount calculated in the correction amount calculation section. The recalculation possibility determination section, during the period between the time when the final ignition timing was calculated in the final ignition timing calculation section and the final ignition timing, determines if the recalculation of the correction amount and the recalculation of the final ignition timing by correcting the base ignition timing with the recalculated correction amount are possible. The final ignition timing recalculation section, when it is determined that the recalculations in the recalculation possibility determination section are possible, recalculates the correction amount and the final ignition timing by correcting the base ignition timing with the recalculated correction amount. When it is determined that the recalculations in the recalculation possibility determination section are possible, the ignition timing setting section sets the final ignition timing recalculated in the final ignition timing recalculation section to the ignition timing used for the actual ignition. When it is determined that the recalculations in the recalculation possibility determination section are impossible, the ignition timing setting section sets the final ignition timing calculated in the final ignition timing calculation section to the ignition timing used for the actual ignition.

Based on this configuration, the effect of the first aspect is obtained. In addition, the ignition timing has not been set in advance. However, the ignition timing is normally guarded on the side of the ignition control system at a minimum advancing angle (set as ATDC: crank angle after top dead center) so that accidental fire is avoided. Moreover, if there is no direction of the final ignition timing to the exampleignition control system, the final ignition timing in the previous control cycle may be used as it is.

DETAILED DESCRIPTION OF THE PREFERRED EMBODIMENTS

Figure 1:
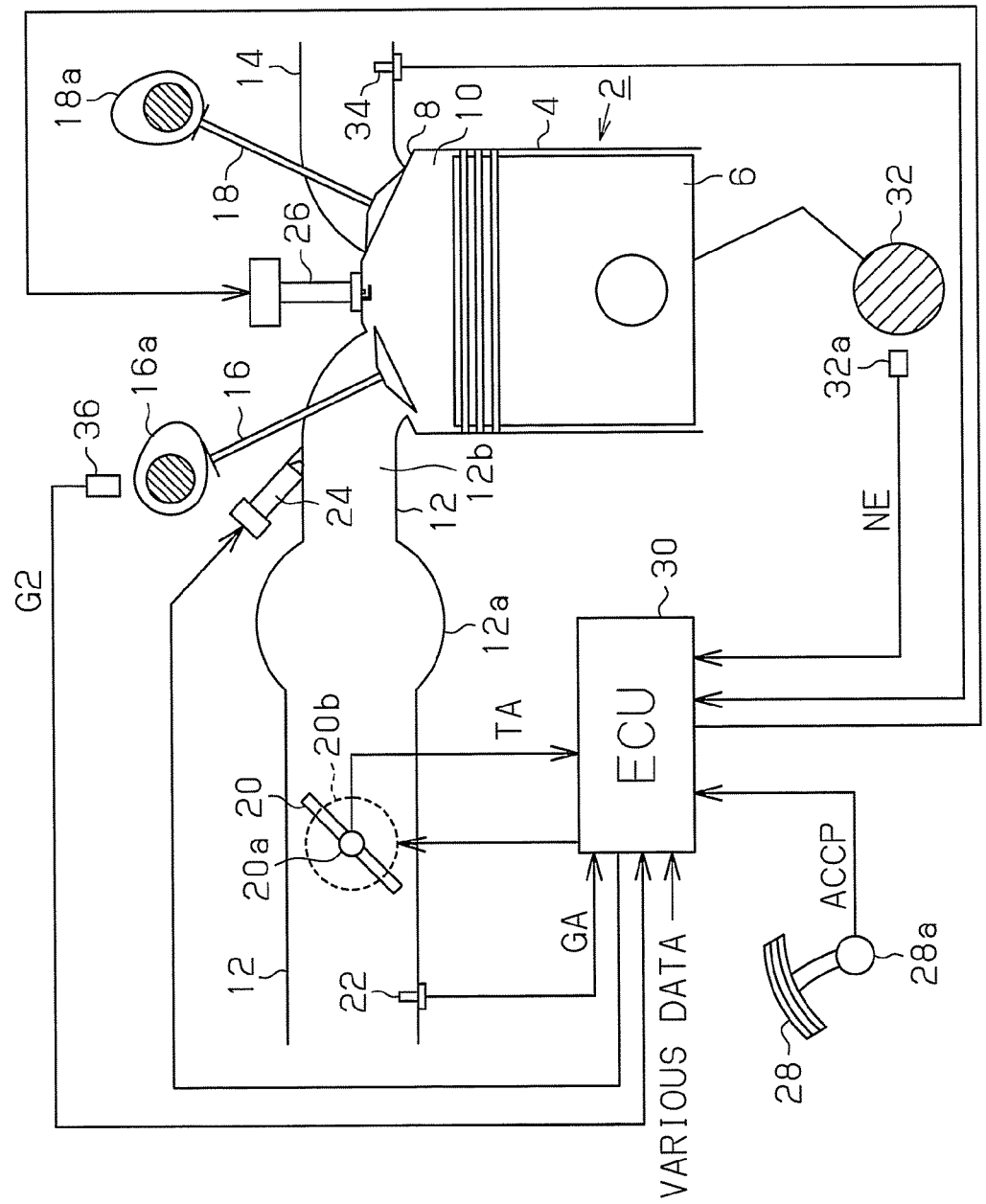
FIG. 1 is a block diagram of an overview of an engine and a control apparatus thereof according to a first embodiment of the invention.

FIG. 1 is a block diagram of an overview of a spark-ignition engine 2 and a control apparatus thereof according to a first embodiment of the invention. The engine 2 is a gasoline engine having a plurality of, e.g. four, cylinders. One of the cylinders is illustrated in FIG. 1. A piston 6 is disposed in each cylinder 4 of the engine 2 to move reciprocally in the cylinder 4. A top surface of the piston 6, an inner wall of the cylinder 4, and a bottom surface of the cylinder head 8 define a combustion chamber 10. An intake passage 12 and an exhaust passage 14 are connected to the combustion chamber 10. The intake passage 12 and the exhaust passage 14 are opened or closed by an inlet valve 16 and an exhaust valve 18, respectively.

A throttle valve 20 is provided on the upstream side of a surge tank 12a provided in the intake passage 12 and adjusts an amount of intake air introduced into the combustion chamber 10. An intake air sensor 22 for measuring an amount of intake air GA is provided on the upstream side of the throttle valve 20. An intake port 12b for each cylinder 4 is located downstream of the surge tank 12a. In one embodiment, a fuel injection valve 24 is provided in the port 12b to inject fuel toward the combustion chamber 10. Alternatively, the fuel injection valve 24 may inject fuel directly into the combustion chamber 10, not via the intake port 12b.

In an intake stroke, an intake valve 16 is opened by an intake cam 16a and intake air is mixed with the fuel injected from the fuel injection valve 24 to form an air-fuel mixture. After the air-fuel mixture is supplied into the combustion chamber 10, the air-fuel mixture is ignited by an ignition plug 26 near the ignition top dead center at the last stage of a compression stroke to shift to a combustion stroke where the piston 6 is depressed. In an exhaust stroke, the exhaust valve 18 is opened by an exhaust cam 18a to exhaust the gas in the combustion chamber 10 to the exhaust passage 14. After that, the exhaust gas is expelled to the outside via a exhaust purifying catalyst or a muffler.

An opening degree of the throttle valve 20 (or throttle opening degree) TA, a fuel injection amount and fuel injection timing by the fuel injection valve 24, and ignition timing by the ignition plug 26 are adjusted based on the results calculated by an electronic control unit (ECU) 30.

The throttle opening degree TA is detected by an throttle opening degree sensor 20a and loaded into the ECU 30. Corresponding to the results calculated based on the ACCP (accelerator operation amount) data of an accelerator sensor 28a which detects a depression amount of an accelerator pedal 28 and other data, a command signal is generated and transmits from the ECU 30 to a control circuit of a throttle motor 20b which drives the throttle valve 20. This drives the throttle valve 20 so that the throttle opening degree TA is adjusted. In particular during idling, the throttle opening degree TA is adjusted so that an engine speed NE detected at an engine speed sensor 32a becomes a target engine speed NEt.

The ECU 30 also calculates a basic fuel amount based on the amount of intake air GA detected by the intake air sensor 22 and the engine speed NE. The ECU 30 also performs feedback control of the basic fuel amount based on an output of the air-fuel ratio sensor 34 provided in the exhaust passage 14 and adjusts the fuel injection amount from the fuel injection valve 24 and its injection timing so that combustion at a proper air-fuel ratio is achieved in the combustion chamber 10.

The ECU 30 also sets ignition timing based on the amount of intake air GA and the engine speed NE and feedback controls the ignition timing to advance or retard to suppress the change of the engine speed NE particularly during idling. The ECU 30 executes cylinder distinction based on a G2 signal from a cam position sensor 36.

Figure 2:
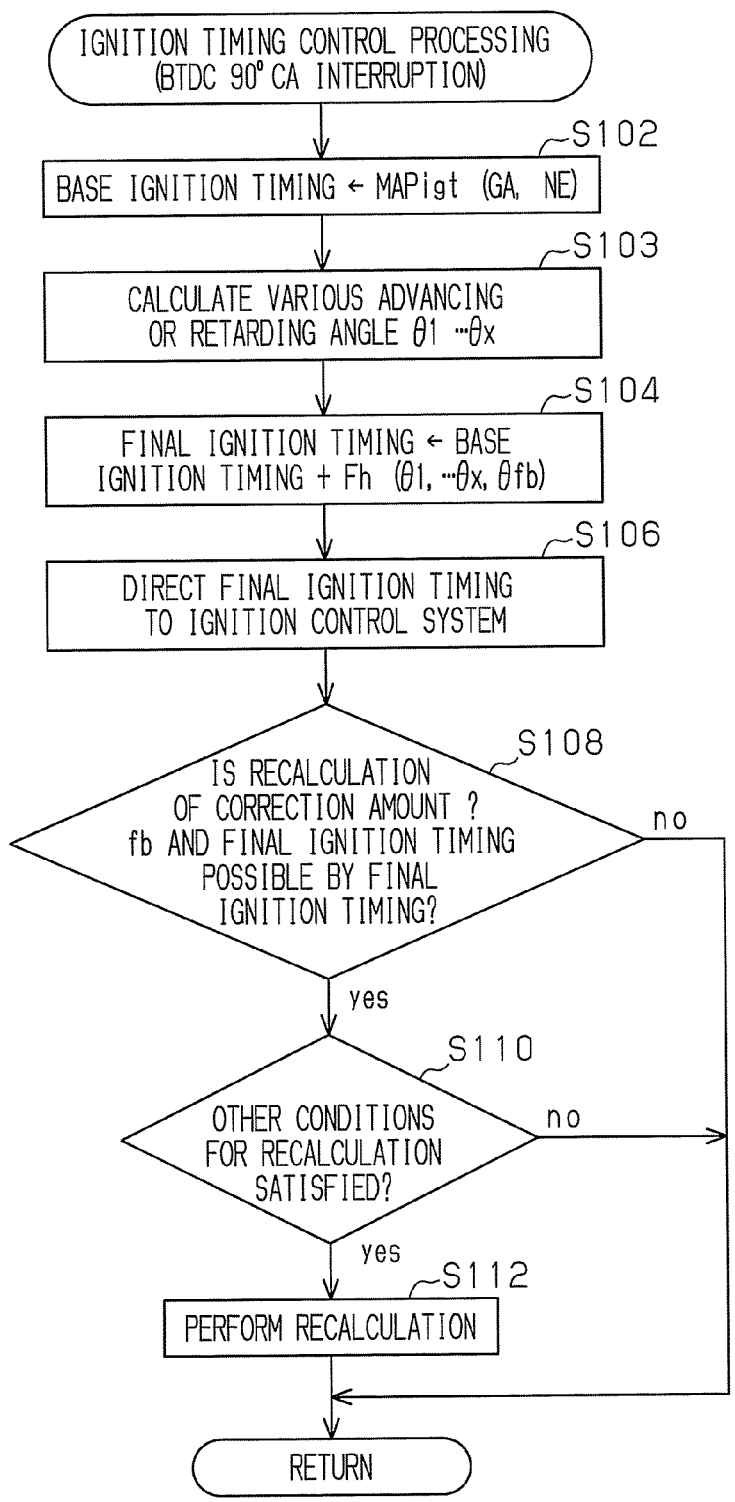
FIG. 2 is a flowchart of ignition timing control processing performed by an ECU according to the first embodiment.

FIG. 2 is a flowchart of ignition timing control processing that the ECU 30 performs. This processing is performed by an interruption at every BTDC 90° CA (90° crank angle before top dead center: corresponding to the timing to calculate the base ignition timing) for each cylinder.

When the processing starts, first, base ignition timing is calculated from a map MAPigt of the base ignition timing based on amount of intake air GA detected by the intake air sensor 22 and the engine speed NE detected by the engine speed sensor 32a (S102). The map MAPigt has been stored in the ECU 30 in advance.

Then, various angles θ1 ... θx required to advance or retard the ignition timing are calculated (S103). For example, the angles θ1 ... θx include an angle during acceleration, an angle during transition, an angle for knock correction, an angle for engine warm-up, an angle for catalyst warmed-up, and an angle for avoiding engine stall.

Next, in correction processing Fh, the base ignition timing is corrected based on the angles θ1 ... θx and the correction amount θfb of the ignition timing by feedback control, which will be referred in detail below, to calculate final ignition timing, as represented by Formula 1 (S104).

$$\text{Final Ignition Timing} \leftarrow \text{Base Ignition Timing} + Fh(\theta1, \ldots \theta x, \theta fb) \qquad [1]$$

Unless the current status is idle, the correction such as the correction amount θfb required during idling is not made.

Next, the final ignition timing calculated from the Formula 1 is directed to an ignition control system (an IC circuit or a program) provided in the ECU 30 (S106). Then, the ignition control system applies current to the ignition plug 26 of the corresponding cylinder to ignite the plug 26 at the final ignition timing unless this timing is replaced.

The calculation proceeding for calculating the correction amount θfb is programmed so that the proceeding is performed by an interruption at every BTDC 180° CA (180° crank angle before ignition top dead center: corresponding to the timing to calculate for feedback control of the ignition timing). That is, the calculation proceeding for calculating the correction amount θfb starts at the time crank angle 90° before the time to start the ignition timing control processing (FIG. 2).

Figure 3:
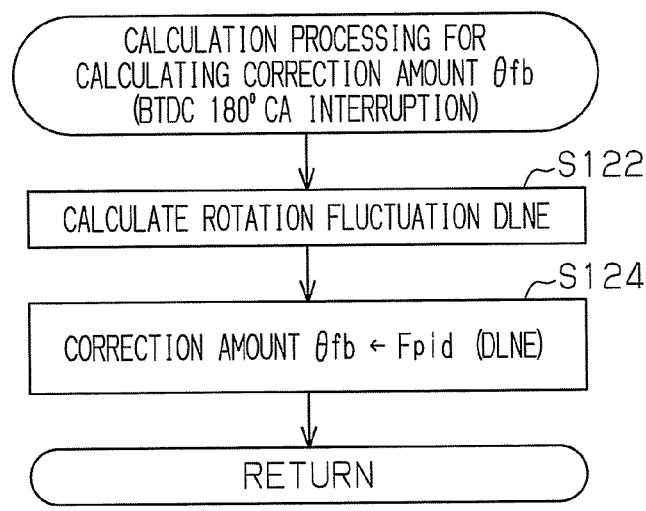
FIG. 3 is a flowchart of calculation processing for calculating a correction amount θfb of the ignition timing by feedback control according to the first embodiment.

In the calculation proceeding for calculating the correction amount θfb of FIG. 3, a rotation fluctuation DLNE of the engine speed NE is first calculated (S122). Various methods for calculating the rotation fluctuation DLNE exist. For example, a mean value NESM of the engine speed NE over a predetermined period is calculated and the difference between the mean value NESM and a current engine speed NE is obtained as the rotation fluctuation DLNE.

Next, calculation processing Fpid for feedback control of the ignition timing is performed based on the rotation fluctuation DLNE to calculate the correction amount θfb of the ignition timing by feedback control (S124). The correction amount θfb is obtained from the PID calculation based on the rotation fluctuation DLNE as represented by Formula 2.

$$\theta fb \to Kp \cdot DLNE + Ki \cdot \Sigma DLNE + Kd \cdot dDLNE/dt \qquad [2]$$

wherein Kp, Ki and Kd are proportionality coefficients, ΣDLNE is an integrated value of the rotation fluctuation DLNE per control cycle, and dDLNE/dt is a variation of the rotation fluctuation change DLNE per control cycle.

As described above, the correction amount θfb is calculated by the processing performed by the interruption at every BTDC 180° CA and used for correcting the base ignition timing in step S104 of the ignition timing control processing (FIG. 2).

Returning now to the ignition timing control processing of FIG. 2, next to step S106, it is determined whether recalculation of the correction amount θfb and recalculation of the final ignition timing using the recalculated correction amount θfb are possible or not during the period between the time when the ignition timing control processing in FIG. 2 was finished and the final ignition timing calculated by the Formula 1 (S108).

Figure 4:
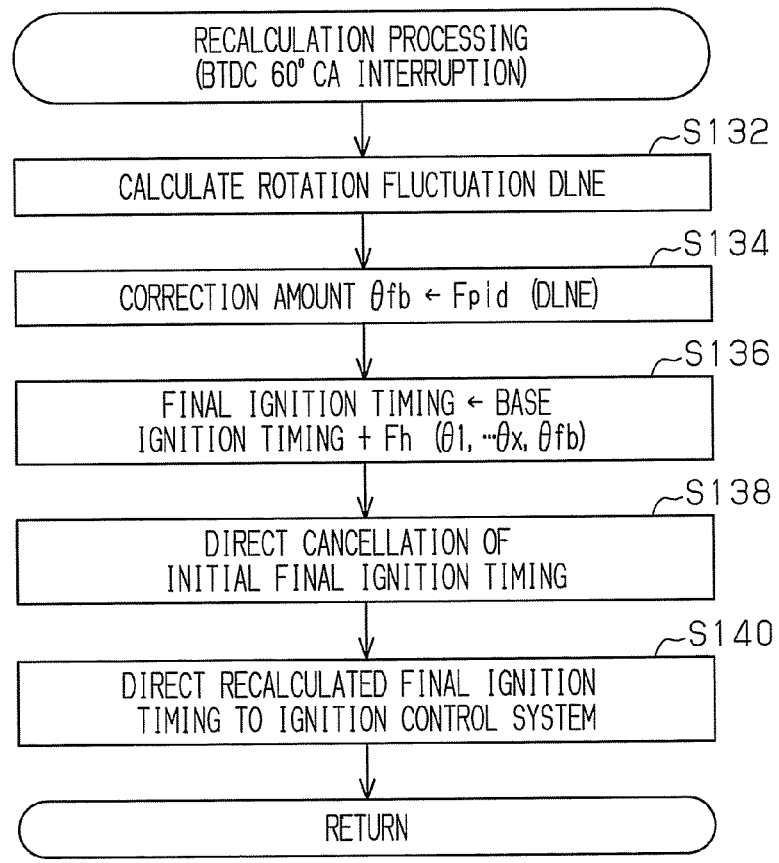
FIG. 4 is a flowchart of recalculation processing according to the first embodiment.

These recalculations are performed by the recalculation processing of FIG. 4 as described below. The recalculation processing is performed in the ECU 30 by an interruption at every BTDC 36° CA. Thus, the period during which a crankshaft 32 rotates between the timing corresponding to BTDC 36° CA and the final ignition timing calculated by the Formula 1 is calculated based on the current engine speed NE. If the recalculation processing of FIG. 4 is possible in that period (YES in S108), it is then determined whether "other conditions for the recalculation" are satisfied (S110). By considering not only the engine speed NE but also the acceleration of the engine speed NE, the period during which the crankshaft 32 rorates may be calculated with higher accuracy.

The "other conditions for the recalculation" in step S110 include conditions such as whether the engine was started, whether the engine is idling, whether rotation of the engine falls within a range suitable for the recalculations, whether the recalculations interfere with the other requirements of the angles to advance or retard the ignition timing, or the like. The time when the recalculations interfere with the other requirements of the angles to advance or retard the ignition timing is, for example, when the ignition timing is performed to warm-up the catalyst or to prevent avoid the engine stall as described above. In such cases, the recalculations are not performed.

When all the above conditions are satisfied, the "other conditions for the recalculation" are also satisfied (YES in S110). Then, the recalculation processing is set (S112). That is, the recalculation processing of FIG. 4 will be performed at BTDC 60° CA.

If it is determined that the recalculation processing of FIG. 4 is impossible in the above period (NO in S108) or it is determined that the "other conditions for the recalculation" are not satisfied (NO in S110), the execution of the recalculation processing is not set and the processing of FIG. 2 ends.

The recalculation processing (FIG. 4) set in step S112 is described. In step S112, the execution of the recalculation processing is set. After that, when the crank angle comes to BTDC 60° CA, calculation of a rotation fluctuation DLNE is performed at that timing (S132). This processing is the same as step S122 in the calculation processing for calculating the correction amount θfb of FIG. 3.

Next, based on the rotation fluctuation DLNE, calculation processing Fpid for feedback control of the ignition timing as represented by the Formula 2 is performed to recalculation the correction amount θfb (S134). This processing is the same as step S124 in in the calculation processing for calculating the correction amount θfb of FIG. 3.

Next, in correction processing Fh represented by the Formula 1, the base ignition timing is corrected based on the angles θ1 . . . θx and the recalculated correction amount θfb to recalculate the final ignition timing (S136). This processing is the same as step S104 in the ignition timing control processing of FIG. 2.

Next, cancellation of the initial final ignition timing, which was directed to the ignition control system in step S106 in the ignition timing control processing FIG. 2, is directed to the ignition control system (S138). Now, the ignition control system has the ability to have new final ignition timing.

Then, the final ignition timing recalculated in step S136 is directed to the ignition control system (S140). This processing is the same as step S106 in the ignition timing control processing of FIG. 2.

Figure 5:
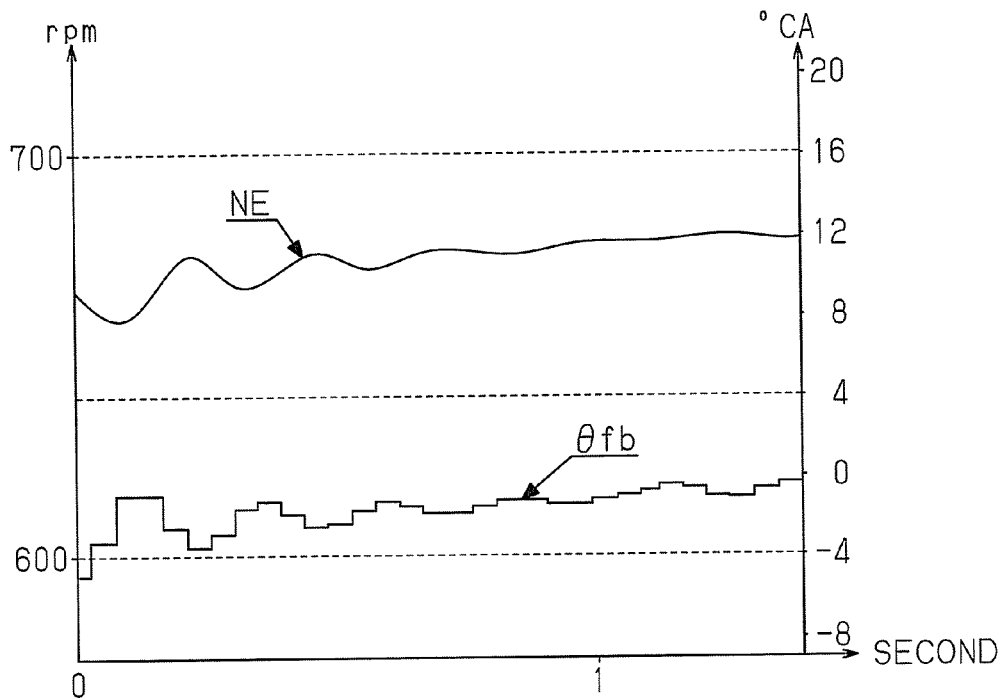
FIG. 5 is a timing chart illustrating an example of the processings of the first embodiment.
Figure 6:
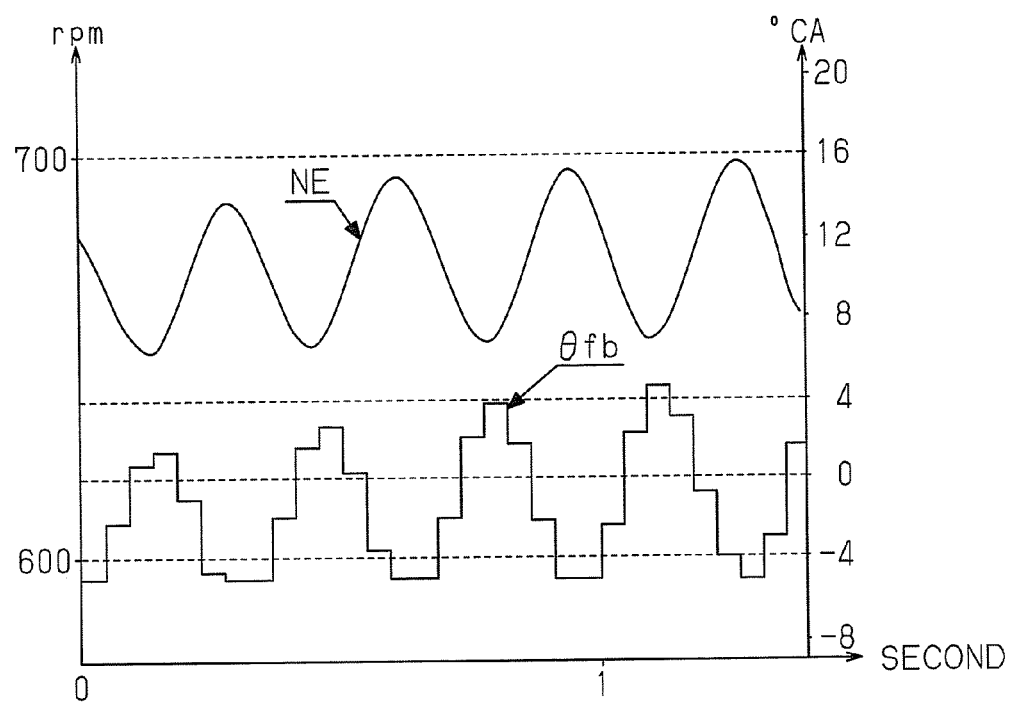
FIG. 6 is a timing chart illustrating a comparative example of the processings.

FIG. 5 illustrates an example of the processings of FIGS. 2 to 4 performed when the change in rotation of the engine occurs. In contrast, FIG. 6 illustrates a comparative example of the processings where the calculation processing for calculating a correction amount θfb at BTDC 180° CA of FIG. 3 is performed but the recalculation processing at BTDC 60° CA of FIG. 4 is not performed. It is shown that the change in rotation of the engine is rapidly suppressed in the example illustrated in FIG. 5 while the change in rotation of the engine is not suppressed in the comparative example illustrated in FIG. 6.

In the configuration of the first embodiment as described above, the ECU 30 corresponds to the base ignition timing calculation section, the correction amount calculation section, the final ignition timing calculation section, the final ignition timing recalculation section, and the ignition timing setting section. Among the processings of FIGS. 2 to 4 performed by the ECU 30, step S102 corresponds to the base ignition timing calculation section. Steps S122 and S124 correspond to the correction amount calculation section. Step S104 corresponds to the final ignition timing calculation section. Steps S112 and S132 to S136 corresponds to the final ignition timing recalculation section. Steps S106, S108, S138 and S140 correspond to the ignition timing setting section.

The ECU 30 may also corresponds to the initial ignition timing setting section, the recalculation possibility determination section, and the final ignition timing resetting section, instead of the ignition timing setting section as described above. In this case, step S106 corresponds to the initial ignition timing setting section, step S108 corresponds to the recalculation possibility determination section, and steps S138 and S140 correspond to the ignition timing resetting section.

The first embodiment has the following advantages.

(1) If it is determined that the recalculation processing (FIG. 4) is possible at BTDC 60° CA and that the other conditions for the recalculation are satisfied (YES in S108 and YES in S110) during the period between the time when the final ignition timing was calculated and the final ignition timing, the correction amount θfb of the ignition timing by feedback control and the final ignition timing are recalculated (S112 and S132 to S136). Then this new final ignition timing is directed to the ignition control system (S138 and S140).

If the recalculation processing (FIG. 4) is not performed (NO in S108 or NO in S110), the final ignition timing, which was calculated at BTDC 90° CA in steps S102 and S104 using the correction amount θfb calculated at the normal timing at BTDC 180° CA in the calculation processing of FIG. 3, is used (S106) as it is.

That is, the final ignition timing used for actual ignition is not determined by using the correction amount θfb calculated at the normal timing at BTDC 180° CA. Instead, the final ignition timing is determined based on the final ignition timing calculated at the normal timing as well as the results of the recalculation, i.e., the recalculation processing (FIG. 4) and the recalculated correction amount θfb obtained by the recalculation processing (FIG. 4). Then, the final ignition timing is directed to the ignition control system in S106, S138 and S140.

Accordingly, if there are results of the recalculation obtained at BTDC 60° CA in the recalculation processing (FIG. 4), the final ignition timing should reflect the engine speed NE at the timing closer to the actual ignition timing. Therefore, even if the feedback gain (proportionality coefficients Kp, Ki and Kd) is increased, overshoot is unlikely to occur. This enables highly responsive ignition timing feedback control thereby suppressing the change in rotation of the engine effectively.

On the other hand, even if the recalculation processing (FIG. 4) is impossible and the results of the recalculation at BTDC 60° do not exist, the final ignition timing has already been set in step S106 where the final ignition timing is calculated at BTDC 90° CA as actual ignition timing by using the correction amount θfb calculated at the normal timing at BTDC 180° CA. Therefore, the final ignition timing is maintained at certain accuracy and abnormal ignition such as accidental fire is prevented.

(2) Even if it is determined that the recalculation processing (FIG. 4) is possible, when the rotation of the engine is rapidly changed immediately after the determination and the final ignition timing elapses on completion of the recalculation started at BTDC 60° CA, ignition at the recalculated final ignition timing is impossible. However, in the first embodiment, the ignition timing has already been set in S106 and this ignition timing is not cancelled when the recalculation fails to complete in time. When the crank angle of the engine 2 reaches a position corresponding to this ignition timing, ignition is carried out at certain accuracy. Thus, abnormal ignition such as accidental fire is prevented.

(3) Whether the recalculation processing (FIG. 4) is performed at BTDC 60° CA or not is determined based on the final ignition timing calculated at the normal timing at 90° CA in step S108. This determination can be performed easily. In addition, if the recalculation processing (FIG. 4) is possible, the recalculation may be performed at suitable timing.

The recalculation processing (FIG. 4) at suitable timing allows the ignition timing to suppress the change in rotation of the engine effectively. Alternatively, by easily determining that the recalculation processing is impossible, the ECU 30 do not have to perform unnecessary processing, which reduces the burden of the ECU 30.

Further, the recalculation processing (FIG. 4) is an interruption processing performed at every BTDC 60° CA. Thus, by referring to the timing BTDC 60° CA and the already calculated final ignition timing in S104, it is easily determined whether the recalculations are possible or not.

In particular, the highly-responsive ignition timing feedback control processings illustrated in FIGS. 3 and 4 are processings for suppressing the change in rotational speed of the engine. Thus, the processings for suppressing the change in rotational speed of the engine during idle becomes highly responsive, thereby suppressing the change in rotational speed effectively.

Figure 7:
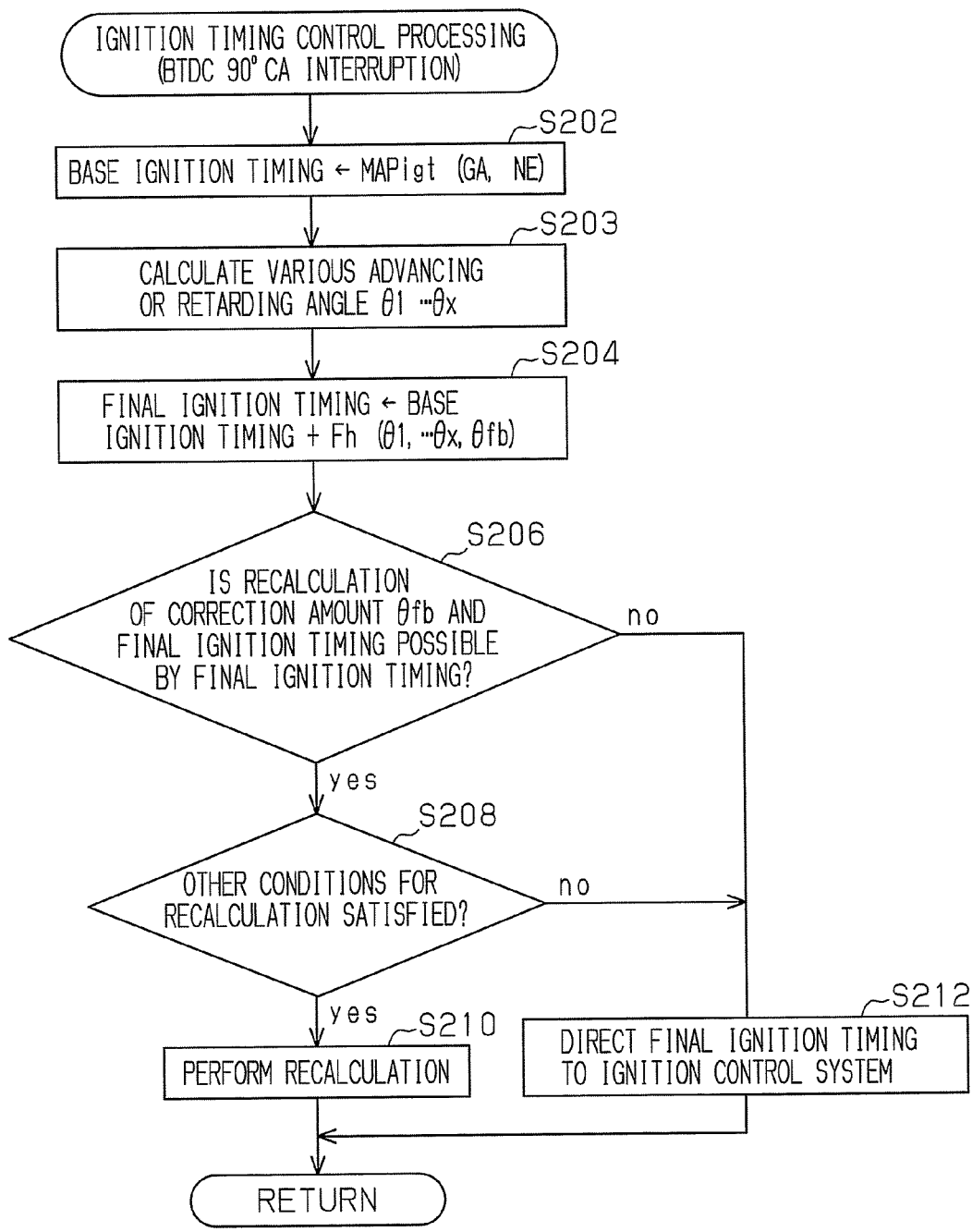
FIG. 7 is a flowchart of ignition timing control processing performed by an ECU according to the second embodiment of the invention.
Figure 8:
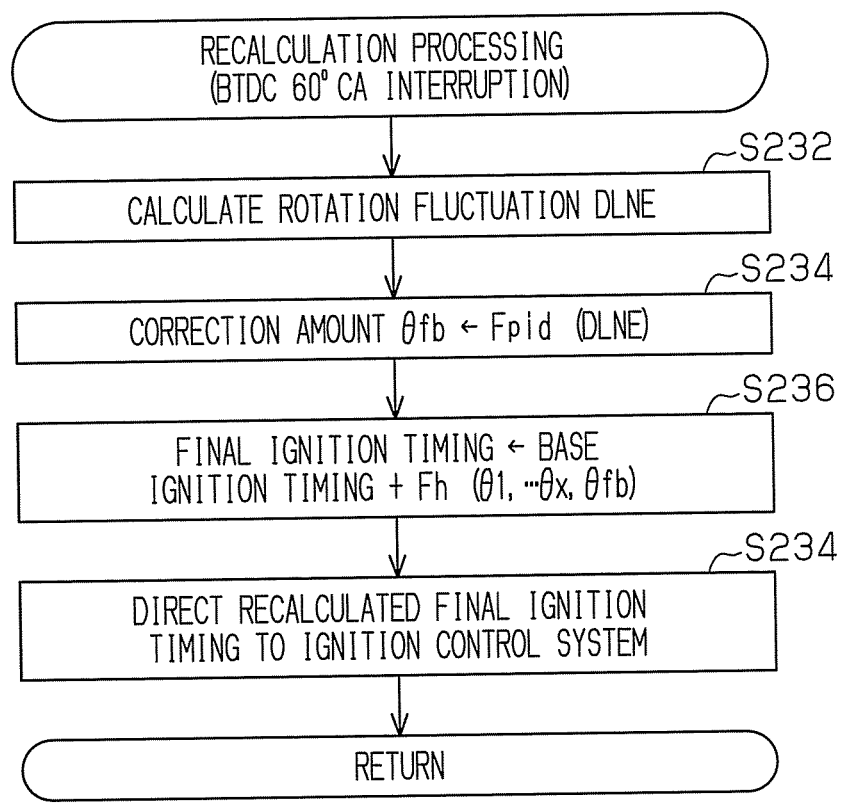
FIG. 8 is a flowchart of recalculation processing according to the second embodiment.

In the second embodiment, ignition timing control processing of FIG. 7 is performed by an interruption at every BTDC 90° CA for each cylinder instead of the processing of FIG. 2 and recalculation processing of FIG. 8 is performed at every BTDC 60° CA instead of the processing of FIG. 4. Since other configuration of the second embodiment is the same as that of the first embodiment, the following description is made also with reference to FIGS. 1 and 3.

When the processing starts, first, base ignition timing is calculated from a map MAPigt of the base ignition timing based on amount of intake air GA and the engine speed NE (S202). This processing is the same as the processing of step S102.

Then, various angles θ1 . . . θx required to advance or retard the ignition timing are calculated (S203). This processing is the same as the processing of step S103.

Next, in correction processing Fh, the base ignition timing is corrected based on the angles θ1 . . . θx and the correction amount θfb of the ignition timing by feedback control, which will be referred in detail below, to calculate final ignition timing, as represented by Formula (S204). This processing is the same as the processing of step S104.

Next, it is determined whether the recalculation processing of FIG. 8 by the final ignition timing calculated in step S204 (S206) is possible. This processing is the same as the processing of step S108.

If it is determined that the recalculation processing of FIG. 8 is possible (YES in S206), it is then determined whether "other conditions for the recalculation" are satisfied (S208). This determination processing is the same as the processing of step S110.

When the "other conditions for the recalculation" are satisfied (YES in S208), the recalculation processing of FIG. 8 is performed (S210). This determination processing is the same as the processing of step S112. Specifically, the recalculation processing is performed at BTDC 60° CA.

Regarding the recalculation processing of FIG. 8, please note that the steps S232 to S238 of FIG. 8 are the same as the steps S132 to S136 and S140 of FIG. 4 except that cancellation of the initial final ignition timing is not directed in the processing of FIG. 8. Accordingly, when the crank angle comes to BTDC 60° CA, calculation of a rotation fluctuation DLNE is performed (S232) and, based on the rotation fluctuation DLNE, calculation processing Fpid represented by the Formula 2 is performed to recalculate the correction amount θfb (S234). Then, in correction processing Fh represented by the Formula 1, the base ignition timing is corrected based on the angles θ1 . . . θx and the recalculated correction amount θfb to recalculate the final ignition timing (S236). Then, the recalculated final ignition timing obtained in step S236 is directed to the ignition control system (S238). Thus, the ignition control system ignites the ignition plug 26 of the corresponding cylinder at the new recalculated final ignition timing.

Returning now to the ignition timing control processing of FIG. 7, if the recalculation processing of FIG. 8 is impossible (NO in S206) or the other condition for the recalculation are not satisfied (NO in S208), the final ignition timing calculated in step S204 is directed to the ignition control system provided in the ECU 30 (S212). This processing is the same as the processing of step S106. This means that the ignition control system ignites the ignition plug 26 of the corresponding cylinder to at the final ignition timing that was initially calculated.

In the configuration of the second embodiment as described above, the ECU 30 corresponds to the base ignition timing calculation section, the correction amount calculation section, the final ignition timing calculation section, the final ignition timing recalculation section and the ignition timing setting section. Among the processings of FIGS. 3, 7 and 8 performed by the ECU 30, step S202 corresponds to the base ignition timing calculation section. Steps S122 and S124 correspond to the correction amount calculation section. Step S204 corresponds to the final ignition timing calculation section. Steps S210 and S232 to S236 correspond to the final ignition timing recalculation section. Step S206, S212 and S238 correspond to the ignition timing setting section.

The ECU 30 may also correspond to the recalculation possibility determination section. In this case, the step S206 corresponds to the recalculation possibility determination section and the steps S212 and S238 correspond to the ignition timing setting section.

The second embodiment has the following advantages.

(1) The second embodiment brings the same effects as the effects (1), (3), and (4) of the first embodiment.

(2) Even if it is determined that the recalculation processing (FIG. 8) is possible, when the rotation of the engine is rapidly changed immediately after the determination and the final ignition timing elapses on completion of the recalculation started at BTDC 60° CA, ignition at the recalculated final ignition timing is impossible. In the second embodiment, the ignition timing has not been set in advance. However, the ignition timing is normally guarded on the side of the ignition control system at a minimum advancing angle (set as ATDC: crank angle after top dead center) so that accidental fire is avoided. Moreover, if there is no direction of the final ignition timing to the example ignition control system, the final ignition timing in the previous control cycle may be used as it is.

Figure 9:
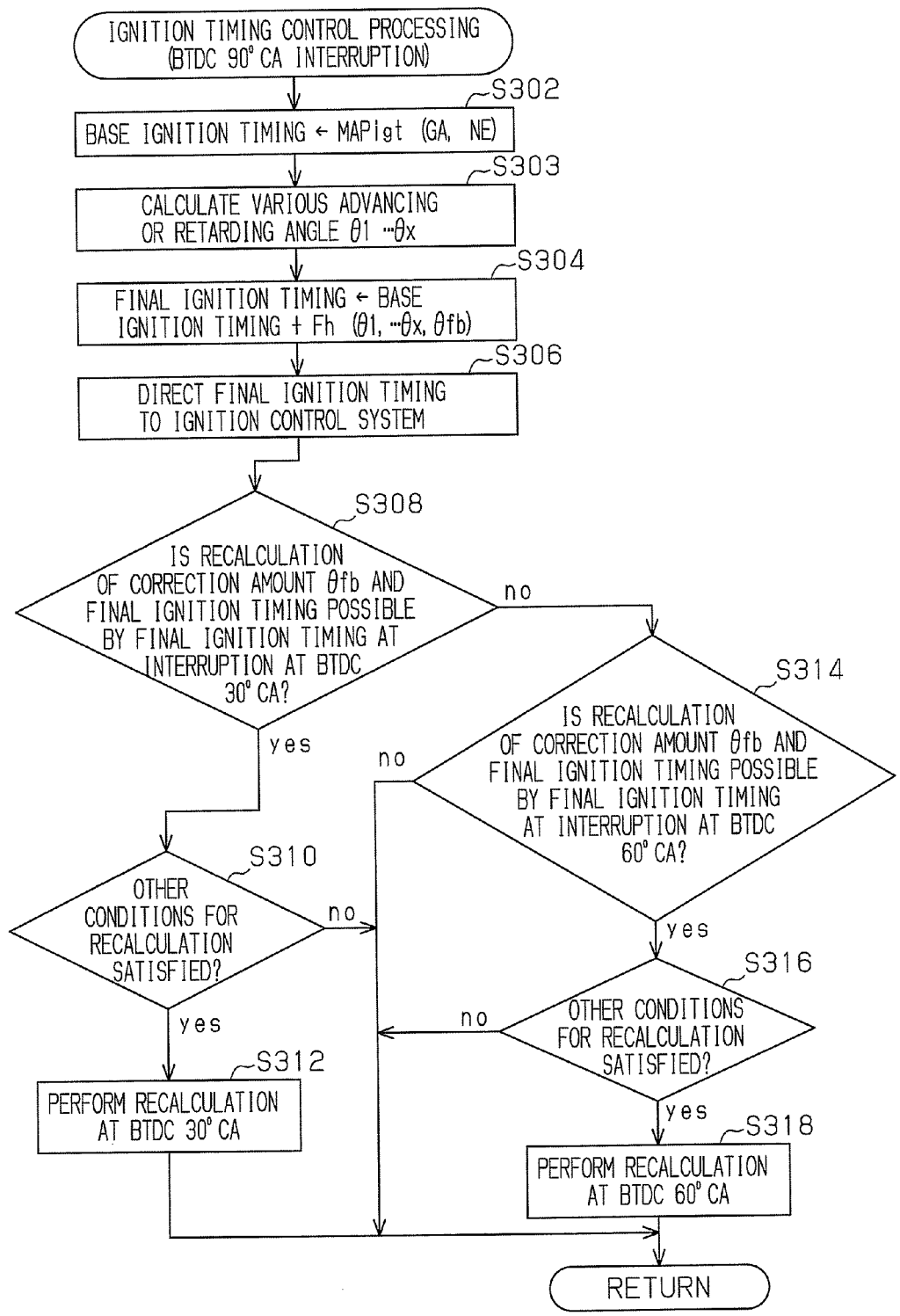
FIG. 9 is a flowchart of ignition timing control processing performed by an ECU according to the third embodiment of the invention.
Figure 10:
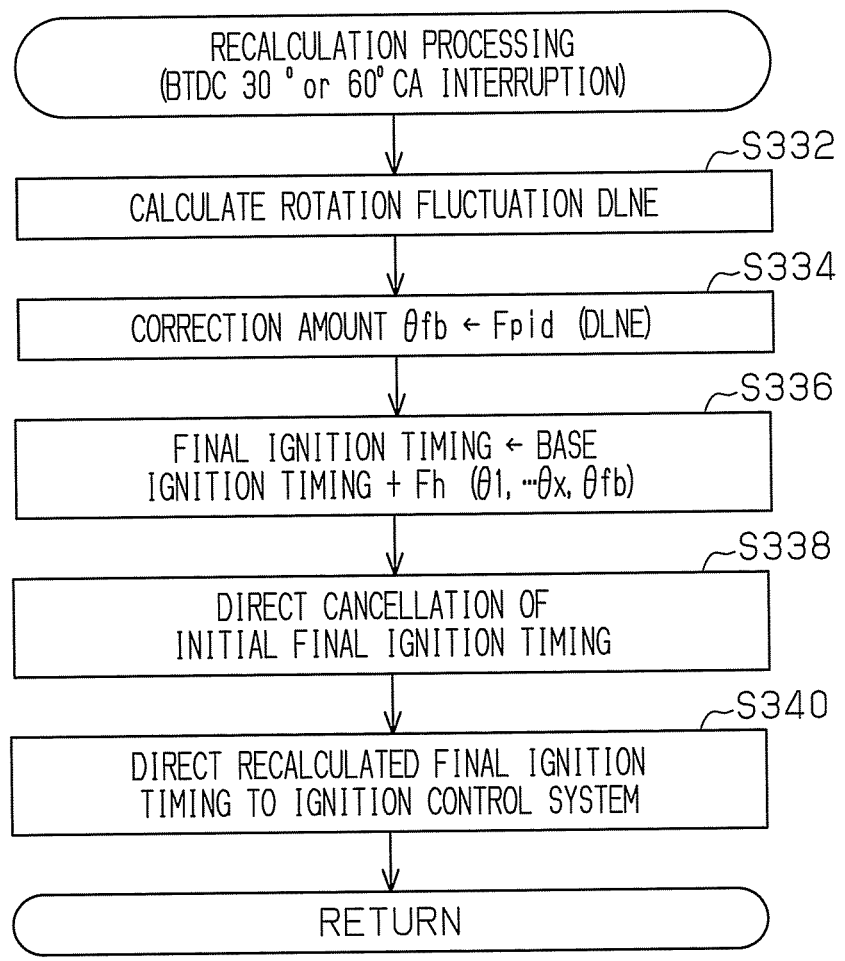
FIG. 10 is a flowchart of recalculation processing according to the third embodiment.

In the third embodiment, ignition timing control processing of FIG. 9 is performed by an interruption at every BTDC 90° CA for each cylinder instead of the processing of FIG. 2 and recalculation processing of FIG. 10 is performed at every BTDC 60° CA instead of the processing of FIG. 4. Since other configuration of the third embodiment is the same as that of the first embodiment, the following description is made also with reference to FIGS. 1 and 3.

When the processing starts, first, base ignition timing is calculated from a map MAPigt of the base ignition timing based on amount of intake air GA and the engine speed NE (S302). This processing is the same as the processing of step S102.

Then, various angles θ1 ... θx required to advance or retard the ignition timing are calculated (S303). This processing is the same as the processing of step S103.

Next, in correction processing Fh, the base ignition timing is corrected based on the angles θ1 ... θx and the correction amount θfb of the ignition timing by feedback control, which will be referred in detail below, to calculate final ignition timing, as represented by Formula 1 (S304). This processing is the same as the processing of step S104.

Then, the final ignition timing thus calculated is directed to the ignition control system provided in the ECU 30 (S306). This processing is the same as the processing of step S106. The ignition control system ignites the ignition plug 26 of the corresponding cylinder at the final ignition timing unless this timing is replaced.

Next to step S306, it is determined whether recalculation of the correction amount θfb and recalculation of the final ignition timing using the recalculated correction amount θfb are possible or not during the period between the time when the ignition timing control processing in FIG. 9 was finished and the final ignition timing calculated by the Formula 1 (S308)

These recalculations are performed by the recalculation processing of FIG. 10. The processings performed in steps S332 to S340 in FIG. 10 are the same as those of performed in steps S132 to S140 in FIG. 4, except that the ECU 30 may perform the recalculation processing of FIG. 10 by an interruption at either BTDC 30° CA or BTDC 60° CA. Thus, in step S308, the period during which the crankshaft 32 rotates between the timing corresponding to BTDC 30° CA and the final ignition timing calculated by the Formula 1 is calculated based on the current engine speed NE. Then, if the recalculation processing of FIG. 10 is possible in that period (YES in S308), it is then determined whether "other conditions for the recalculation" are satisfied (S310).

The determination of step S310 is the same as that of step S110 in FIG. 2. If the "other conditions for the recalculation" are satisfied (YES in S310), the recalculation processing at 30° CA is set (S312). That is, the recalculation processing will be performed at BTDC 30° CA (FIG. 10) where the recalculation of the correction amount θfb and the final ignition timing is performed in steps S332 to S336, the initial final ignition timing is cancelled in step S338, and the recalculated final ignition timing obtained in step S336 is directed to the ignition control system in S340.

If it is determined that the "other conditions for the recalculation" are not satisfied (NO in S310), the processing of FIG. 9 ends.

If it is determined that the recalculation processing (FIG. 10) at BTDC 30° CA is impossible (NO in step S308), it is then determined whether the recalculation of the correction amount θfb and recalculation of the final ignition timing are possible or not by the final ignition timing calculated in step S304 provided that the recalculation processing is performed at every BTDC 60° CA (S314). These recalculations are also performed in the recalculation processing of FIG. 10. In step S314, the period during which the crankshaft 32 rotates between the timing corresponding to BTDC 60° CA and the final ignition timing calculated by the Formula 1 is calculated based on the current engine speed NE. If the recalculation processing of FIG. 10 is possible in that period (YES in S314), it is then determined whether "other conditions for the recalculation" are satisfied (S316). The determination of step step S316 is the same as that of step S310. If the "other conditions for the recalculation" are satisfied (YES in S316), the recalculation processing at 36° CA is set (S318). That is, the recalculation processing will be performed at BTDC 60° CA (FIG. 10) where the recalculation of the correction amount θfb and the final ignition timing is performed in steps S332 to S336, the initial final ignition timing is cancelled in step S338, and the recalculated final ignition timing obtained in step S336 is directed to the ignition control system in S340.

If it is determined that the recalculation processing of FIG. 10 is impossible (NO in S314) or it is determined that the "other conditions for the recalculation" are not satisfied (NO in S316), the processing of FIG. 9 ends.

In the configuration of the third embodiment as described above, the ECU 30 corresponds to the base ignition timing calculation section, the correction amount calculation section, the final ignition timing calculation section, the final ignition timing recalculation section, and the ignition timing setting section. Among the processings of FIGS. 3, 9 and 10 performed by the ECU 30, step S302 corresponds to the base ignition timing calculation section. Steps S122 and S124 correspond to the correction amount calculation section. Step S304 corresponds to the final ignition timing calculation section. Step S312, S318 and S332 to S336 correspond to the final ignition timing recalculation section. Step S306, S308, S314, S338 and S340 correspond to the ignition timing setting section.

The ECU 30 may also corresponds to the initial ignition timing setting section, the recalculation possibility determination section, and the ignition timing resetting section, instead of the ignition timing setting section. In this case, step S306 corresponds to the initial ignition timing setting section, steps S308 and S314 correspond to the recalculation possibility determination section, and steps S338 and S340 correspond to the ignition timing resetting section.

The third embodiment has the following advantages.

(1) The third embodiment not only brings the same effects of the first embodiment but also determines if the recalculations are possible or not both at BTDC 30° CA and at BTDC 60° CA. Accordingly, if the recalculations are possible at BTDC 30° CA, the final ignition timing should reflect the engine speed at the timing closer to the actual ignition timing than the timing obtained by the recalculation at BTDC 60° CA. Alternatively, even if the recalculation at BTDC 30° CA is impossible, the final ignition timing should still reflect the engine speed NE at the timing closer to the actual ignition timing than the timing corresponding to BTDC 180° CA. Therefore, the effects of the first embodiment are enhanced.

The above embodiments may be modified as follows.

(a) In the above embodiments, the timing of the interruption of recalculation processing is selected from the fixed timing, the timing corresponding to BTDC 60° CA only, and the timing corresponding BTDC 60° CA or BTDC 30°.

However, instead of fixing the timing of the recalculation processing, it is possible in steps S108 and S206 to calculate timing at which the recalculations are possible during the period before the final ignition timing and to determine whether or not such timing has passed the time when the ignition timing control processing in FIG. 2 or 7 is finished. If the determination is affirmative, the recalculation processing of FIG. 4 or 8 may be performed at the timing calculated in steps S108 or S206.

(b) In the above embodiments, the determination whether the recalculation of the correction amount θfb and the final ignition timing is possible or not is performed during the period between the time when the final ignition timing was calculated and the final ignition timing. In other words, the final ignition timing is used as a final limit of the recalculation. However, the final limit may be the timing an extra period before the final ignition timing.

For example, considering a fluctuation range of the recalculated final ignition timing recalculation into account, such extra period as corresponding to the maximum fluctuation range may be preset. This configuration deals with the fluctuation of the recalculated final ignition timing more precisely, enabling the determination whether the recalculations are possible or not to be performed more accurately.

(c) The above embodiments address the change in the engine speed NE during idling. However, by canceling the conditions during idling in steps S110, S208, S310 and S316, the ignition timing control apparatus may address the change in engine speed NE in an operating state of the engine other than the idling state.

(d) In the first and third embodiments, if the final ignition timing is replaced with the new one by simply directing the recalculated final ignition timing to the ignition control system, the direction of the cancellation in steps S138 and S338 may be omitted. In such a case, the ignition control system applies current to the ignition plug 26 of the corresponding cylinder to ignite the plug 26 at the new recalculated final ignition timing.

The invention claimed is:

1. An ignition timing control apparatus for an internal combustion engine, wherein the ignition timing control apparatus sets ignition timing depending on an operating state of the engine and performs feedback control of the ignition timing with respect to rotational speed of the engine, the ignition timing control apparatus comprising:
 a base ignition timing calculation section, wherein the base ignition timing calculation section calculates base ignition timing based on the operating state of the engine at a time to calculate the base ignition timing set prior to an ignition top dead center;
 a correction amount calculation section, wherein the correction amount calculation section calculates a correction amount of the ignition timing by feedback control at a time to calculate the feedback control of the ignition timing set prior to the ignition top dead center;
 a final ignition timing calculation section, wherein the final ignition timing calculation section calculates final ignition timing by correcting the base ignition timing calculated in the base ignition timing calculation section with the correction amount calculated in the correction amount calculation section;
 an initial ignition timing setting section, wherein the initial ignition timing setting section sets the final ignition timing calculated in the final ignition timing calculation section to ignition timing used for an actual ignition;
 a recalculation possibility determination section, wherein the recalculation possibility determination section, during the period between the time when the final ignition timing was calculated in the final ignition timing calculation section and the final ignition timing, determines if the recalculation of the correction amount and the recalculation of the final ignition timing by correcting the base ignition timing with the recalculated correction amount are possible;
 a final ignition timing recalculation section, wherein the final ignition timing recalculation section, when it is determined that the recalculations in the recalculation possibility determination section are possible, recalculates the correction amount and the final ignition timing by correcting the base ignition timing with the recalculated correction amount; and
 ignition timing resetting section, wherein the ignition timing resetting section, when the final ignition timing is recalculated in the final ignition timing recalculation section, cancels the setting of the ignition timing in the initial ignition timing setting section and sets the final ignition timing recalculated in the final ignition timing recalculation section to the ignition timing used for the actual ignition.

2. An ignition timing control apparatus for an internal combustion engine, wherein the ignition timing control apparatus sets ignition timing depending on an operating state of the engine and performs feedback control of the ignition timing with respect to rotational speed of the engine, the ignition timing control apparatus comprising:
 a base ignition timing calculation section, wherein the base ignition timing calculation section calculates base ignition timing based on the operating state of the engine at a time to calculate the base ignition timing set prior to an ignition top dead center;
 a correction amount calculation section, wherein the correction amount calculation section calculates a correction amount of the ignition timing by feedback control at a time to calculate the feedback control of the ignition timing set prior to the ignition top dead center;
 a final ignition timing calculation section, wherein the final ignition timing calculation section calculates final ignition timing by correcting the base ignition timing calculated in the base ignition timing calculation section with the correction amount calculated in the correction amount calculation section;
 a recalculation possibility determination section, wherein the recalculation possibility determination section, during the period between the time when the final ignition timing was calculated in the final ignition timing calculation section and the final ignition timing, determines if the recalculation of the correction amount and the recalculation of the final ignition timing by correcting the base ignition timing with the recalculated correction amount are possible;
 a final ignition timing recalculation section, wherein the final ignition timing recalculation section, when it is determined that the recalculations in the recalculation possibility determination section are possible, recalculates the correction amount and the final ignition timing by correcting the base ignition timing with the recalculated correction amount; and
 an ignition timing setting section, wherein,
 when it is determined that the recalculations in the recalculation possibility determination section are possible, the ignition timing setting section sets the final ignition timing recalculated in the final ignition timing recalculation section to the ignition timing used for the actual ignition and,
 when it is determined that the recalculations in the recalculation possibility determination section are impossible, the ignition timing setting section sets the final ignition timing calculated in the final ignition timing calculation section to the ignition timing used for the actual ignition.

3. The ignition timing control apparatus of claim 1 wherein the final ignition timing recalculation section recalculates the correction amount and the final ignition timing in interrupt processing at regular intervals, wherein, when the next interrupt processing in the final ignition timing recalculation section is completed prior to the final ignition timing calculated in the final ignition timing calculation section, the recalculation possibility determination section determines that the next recalculations are possible and, when the next interrupt processing is not completed prior to the final ignition timing, the recalculation possibility determination section determines that the next recalculations are impossible.

4. The ignition timing control apparatus of claim 1 wherein, when the next recalculation in the final ignition timing recalculation section is completed more than an extra period before the final ignition timing calculated in the final ignition timing calculation section, the recalculation possibility determination section determines that the next recalculations are possible and, when the next recalculation in the final ignition timing recalculation section is not completed more than the extra period before the final ignition timing, the recalculation possibility determination section determines that the next recalculations are impossible.

5. The ignition timing control apparatus of claim 4 wherein the extra period is predetermined based on a fluctuation range of the final ignition timing recalculated in the final ignition timing recalculation section.

6. The ignition timing control apparatus of claim 1 wherein the calculation of the correction amount by feedback control is performed as proceeding for suppressing the change in the rotational speed of the engine during idling.

7. The ignition timing control apparatus of claim 2 wherein the final ignition timing recalculation section recalculates the correction amount and the final ignition timing in interrupt processing at regular intervals, wherein, when the next interrupt processing in the final ignition timing recalculation section is completed prior to the final ignition timing calculated in the final ignition timing calculation section, the recalculation possibility determination section determines that the next recalculations are possible and, when the next interrupt processing is not completed prior to the final ignition timing, the recalculation possibility determination section determines that the next recalculations are impossible.

8. The ignition timing control apparatus of claim 2 wherein, when the next recalculation in the final ignition timing recalculation section is completed more than an extra period before the final ignition timing calculated in the final ignition timing calculation section, the recalculation possibility determination section determines that the next recalculations are possible and, when the next recalculation in the final ignition timing recalculation section is not completed more than the extra period before the final ignition timing, the recalculation possibility determination section determines that the next recalculations are impossible.

9. The ignition timing control apparatus of claim 8 wherein the extra period is predetermined based on a fluctuation range of the final ignition timing recalculated in the final ignition timing recalculation section.

10. The ignition timing control apparatus of claim 2 wherein the calculation of the correction amount by feedback control is performed as proceeding for suppressing the change in the rotational speed of the engine during idling.

* * * * *

UNITED STATES PATENT AND TRADEMARK OFFICE
CERTIFICATE OF CORRECTION

PATENT NO. : 8,459,230 B2  Page 1 of 1
APPLICATION NO. : 12/599422
DATED : June 11, 2013
INVENTOR(S) : Miyazaki et al.

It is certified that error appears in the above-identified patent and that said Letters Patent is hereby corrected as shown below:

In the Specification at column 6, line 43, equation 2:
Delete "$\theta fb \rightarrow Kp \cdot DLNE + Ki \cdot \Sigma DLNE + Kd \cdot dDLNE/dt$" and insert therefor
--$\theta fb \leftarrow Kp \cdot DLNE + Ki \cdot \Sigma DLNE + Kd \cdot dDLNE/dt$--;

at column 6, line 65:
Delete "BTDC 36° CA" and insert therefor --BTDC 60° CA--;

at column 6, line 67:
Delete "36° CA" and insert therefor --60° CA--;

at column 12, line 6:
Delete "(YES in 5314)" and insert therefor --(YES in S314)--.

Signed and Sealed this
Third Day of September, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,459,230 B2
APPLICATION NO. : 12/599422
DATED : June 11, 2013
INVENTOR(S) : Miyazaki et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 885 days.

Signed and Sealed this
Eighth Day of September, 2015

Michelle K. Lee
*Director of the United States Patent and Trademark Office*